United States Patent [19]

Fujimoto et al.

[11] Patent Number: 6,132,903
[45] Date of Patent: Oct. 17, 2000

[54] LITHIUM SECONDARY BATTERY COMPRISING A NEGATIVE ELECTRODE CONSISTING ESSENTIALLY OF $B_2O_3$

[75] Inventors: Masahisa Fujimoto, Osaka; Toshiyuki Nohma; Koji Nishio, both of Hirakata, all of Japan

[73] Assignee: Sanyo Electric Co., Ltd., Osaka, Japan

[21] Appl. No.: 09/118,007

[22] Filed: Jul. 17, 1998

[30] Foreign Application Priority Data

Jul. 17, 1997 [JP] Japan ................................ 9-210113

[51] Int. Cl.⁷ ...................................... H01M 4/02
[52] U.S. Cl. .................... 429/231.95; 429/218.1
[58] Field of Search ............... 429/231.95, 218.1

[56] References Cited

U.S. PATENT DOCUMENTS

| | | |
|---|---|---|
| 5,506,075 | 4/1996 | Iwasaki et al. . |
| 5,618,640 | 4/1997 | Idota et al. . |

FOREIGN PATENT DOCUMENTS

| | | |
|---|---|---|
| 6-223830 | 8/1994 | Japan . |
| 6-318457 | 11/1994 | Japan . |
| 6-318458 | 11/1994 | Japan . |
| 6-338325 | 12/1994 | Japan . |
| 7-122274 | 5/1995 | Japan . |
| 230800 | 8/1995 | Japan . |
| 7-201318 | 8/1995 | Japan . |
| 7-220721 | 8/1995 | Japan . |
| 7-288123 | 10/1995 | Japan . |
| 11260363 | 9/1999 | Japan .................. 429/231.95 |

*Primary Examiner*—Maria Nuzzolillo
*Assistant Examiner*—Monique M. Wills
*Attorney, Agent, or Firm*—Birch, Stewart, Kolasch & Birch, LLP

[57] ABSTRACT

Provided is a lithium secondary battery which has a large discharge capacity and good charge-discharge cycle characteristics comprising a negative electrode in which the lithium ion-occlusion material is an amorphous material consisting essentially of $B_2O_3$ or an amorphous material consisting essentially of $B_2O_2$ and an oxide whose cation-oxygen bond strength is smaller than 335 kJ/mole.

12 Claims, No Drawings

LITHIUM SECONDARY BATTERY COMPRISING A NEGATIVE ELECTRODE CONSISTING ESSENTIALLY OF $B_2O_3$

BACKGROUND OF THE INVENTION

This application claims the priority of Japanese Patent Application No. 9-210113 filed on Jul. 17, 1997.

1. Field of the Invention

The present invention relates to a lithium secondary battery which comprises a positive electrode, a negative electrode comprising a lithium ion-occlusion material and a nonaqueous electrolyte and, more particularly to improvements in the lithium ion-occlusion material to be used in the negative electrode for the purpose of providing a lithium secondary battery having a large discharge capacity and good charge-discharge cycle characteristics.

2. Description of the Prior Art

Carbonaceous materials are well known as lithium ion-occlusion materials to be used in the negative electrode of lithium secondary batteries.

However, since carbonaceous materials have conductivity, overcharge may possibly result in ramiform deposition of metallic lithium on the surface thereof. Therefore, when a carbonaceous material is used, it is necessary to prevent overcharge of the carbonaceous material by decreasing the capacity of the positive electrode and/or using a charger provided with an overcharge preventing function, for instance.

Therefore, oxides of elements of the group IVB or VB of the periodic table, for example oxides of Ge, Sn and so on, have been proposed as lithium ion-occlusion materials for negative electrodes substituting for the carbonaceous materials (cf. Japanese Kokai Tokkyo Koho H07-122274). It is stated that by using these oxides, it is possible to obtain secondary batteries which have a relatively large discharge capacity and do not cause ramiform deposition of metallic lithium on the surface of the negative electrode even upon overcharge.

However, check experiments made by the present inventors revealed that when these oxides are used as lithium ion-occlusion materials for negative electrodes, the oxide structure rapidly undergoes destruction upon repeated charge and discharge, namely repeated lithium ion incorporation and elimination, whereby the discharge capacity decreases in a small number of charge-discharge cycles. Thus, it was revealed that the secondary batteries disclosed in Japanese Kokai Tokkyo Koho H07-122274 have a problem in terms of charge-discharge cycle characteristics.

Accordingly, it is an object of the present invention to provide a lithium secondary battery having a large discharge capacity and good charge-discharge cycle characteristics.

SUMMARY OF THE INVENTION

In the present invention, an amorphous material comprising a specific oxide is used as the lithium ion-occlusion material for the negative electrode in lieu of the oxides of group IVB or VB elements in order to achieve the above object. Thus, a lithium secondary battery (first battery) according to the present invention comprises a positive electrode, a negative electrode in which the lithium ion-occlusion material is an amorphous material consisting essentially of $B_2O_3$ (diboron trioxide), and a nonaqueous electrolyte. Another lithium secondary battery (second battery) according to the present invention comprises a positive electrode, a negative electrode in which the lithium ion-occlusion material is an amorphous material consisting essentially of $B_2O_3$ and an oxide whose cation-oxygen bond strength is smaller than 335 kJ/mole, and a nonaqueous electrolyte. In this specification, the first and second batteries are sometimes collectively referred to as "the batteries of the present invention."

In the first battery, an amorphous material consisting essentially of $B_2O_3$ is used as the lithium ion-occlusion material. This amorphous material can be prepared, for example, by heating $B_2O_3$ for melting, followed by cooling. The cation-oxygen bond strength of $B_2O_3$ is more than 335 kJ/mole and this oxide can readily form an amorphous material. Since it is a component forming an irregular three-dimensional network structure of glass, it is called a network-forming oxide or glass-forming oxide. There are other network-forming oxides, such as $GeO_2$, $SiO_2$, $P_2O_5$, $As_2O_3$, $Sb_2O_3$ and $V_2O_5$. However, these other network-forming oxides cannot give lithium secondary batteries having good characteristics.

In the second battery, an amorphous material consisting essentially of $B_2O_3$ and an oxide whose cation-oxygen bond strength is smaller than 335 kJ/mole is used as the lithium ion-occlusion material. This amorphous material can be prepared by heating and melting $B_2O_3$ and an oxide whose cation-oxygen bond strength is smaller than 335 kJ/mole, followed by cooling. As the oxide whose cation-oxygen bond strength is smaller than 335 kJ/mole, there may be mentioned modifier oxides such as $MoO_2$ (cation-oxygen bond strength<250 kJ/mole), $WO_3$ (bond strength<250 kJ/mole), $W_2O_5$, (bond strength<250 kJ/mole), $Bi_2O_3$ (bond strength<250 kJ/mole), $Sc_2O_3$ (bond strength=250 kJ/mole), $La_2O_3$ (bond strength=242 kJ/mole), $Y_2O_3$ (bond strength=209 kJ/mole), MgO (bond strength=155 kJ/mole), $Li_2O$ (bond strength=151 kJ/mole), BaO (bond strength=138 kJ/mole), CaO (bond strength=134 kJ/mole), SrO (bond strength=134 kJ/mole), $Na_2O$ (bond strength=84 kJ/mole) and $K_2O$ (bond strength=54 kJ/mole) as well as intermediate oxides such as PbO (bond strength=180 kJ/mole), ZnO (bond strength=180 kJ/mole), CdO (bond strength=251 kJ/mole), $TiO_2$ (bond strength=305 kJ/mole), $ZrO_2$ (bond strength=255 kJ/mole) and $Al_2O_3$ (bond strength=222 kJ/mole). The modifier oxides enter the networks formed by network-forming oxides and modify the properties of amorphous materials. The intermediate oxides by themselves cannot form amorphous materials but have simultaneously a role as network-forming oxides as resulting from their cation slightly substituting for $B^{3+}$ to partially participating the networks and a role as modifier oxides. A modifier oxide and an intermediate oxide may both be used as the oxide whose cation-oxygen bond strength is smaller than 335 kJ/mole. The modifier oxides and intermediate oxides such as mentioned above may be used respectively singly or, where necessary, two or more may be selected from the respective groups.

The amorphous material to be used as the lithium ion-occlusion material in the second battery is preferably composed of 1 mole part of $B_2O_3$, and not more than 9 mole parts of an oxide whose cation-oxygen bond strength is smaller than 335 k J/mole. When the proportion of the oxide whose cation-oxygen bond strength is smaller than 335 kJ/mole is too excessive, a decreased discharge capacity and poor charge-discharge cycle characteristics will result.

The present invention relates to improvements of the lithium ion-occlusion materials for negative electrodes of lithium secondary batteries. Therefore, as regards other battery-constituting parts and elements, those conventional materials known for lithium secondary batteries can be used without any limitation.

As examples of the positive electrode active material, there may be mentioned lithium-transition metal composite oxide, such as $LiCoO_2$, $LiNiO_2$, $LiFeO_2$, $LiTiO_2$ and $LiMn_2O_4$.

As examples of the solvent in the nonaqueous electrolyte solution, there may be mentioned cyclic carbonate such as ethylene carbonate (EC), propylene carbonate (PC), vinylene carbonate (VC) and butylene carbonate (BC) as well as mixed solvents composed of such a cyclic carbonate and a low-boiling solvent such as dimethyl carbonate (DMC), diethyl carbonate (DEC), methyl ethyl carbonate (MEC), 1,2-dimethoxyethane (DME), 1,2-diethoxyethane (DEE) and ethoxymethoxyethane (EME). As examples of the solute (electrolyte salt) in the nonaqueous electrolyte solution, there may be mentioned $LiPF_6$, $LiAsF_6$, $LiSbF_6$, $LiBF_4$ and $LiClO_4$. Solid electrolytes may also be used.

The battery of the present invention has a large discharge capacity and good charge-discharge cycle characteristics. The reason why its charge-discharge cycle characteristics are good is not certain but may presumably be that since $B_2O_3$ used as the lithium ion-occlusion material of the negative electrode is an amorphous material having a stable three-dimensional network structure, repetitions of lithium incorporation and elimination can hardly lead to destruction of the structure.

EXAMPLES

The following examples illustrate the present invention in further detail but are by no means limitative of the scope of the invention. Various modifications may be made without departing from the spirit and scope thereof.

Experiment 1

In this experiment, first battery A1 in which the lithium ion-occlusion material was an amorphous material consisting of a network-forming oxide, and a comparative battery AC1 in which the lithium ion-occlusion material was an amorphous material consisting of a modifier oxide were fabricated and each was evaluated for its discharge capacity and charge-discharge cycle characteristics.

Fabrication of first battery A1

The positive electrode, negative electrode and nonaqueous electrolyte solution were prepared as described below and, using these, first battery A1 (AA-size) was fabricated. The capacity ratio between positive electrode and negative electrode was 1:1.1. A microporous polypropylene membrane was used as the separator. The battery size was 18 mm in diameter and 65 mm in height.

Preparation of positive electrode

A slurry was prepared by kneading 90 weight parts of $LiCoO_2$, 6 weight parts of acetylene black (conductive agent) and an N-methyl-2-pyrrolidone (NMP) solution of 4 weight parts of polyvinylidene fluoride. This slurry was applied to both sides of an aluminum foil (current collector) by the doctor blade method. The subsequent drying under vacuum at 100° C. for 2 hours gave a positive electrode.

Preparation of negative electrode $B_2O_3$ (network-forming oxide) was melted by heating at 1,000° C. in a nitrogen gas atmosphere, then gradually cooled at a rate of 10° C./minute, and ground to give a glass powder (amorphous material) consisting of $B_2O_3$ with a mean particle size of 10 μm. The fact that X-ray diffraction analysis (XRD) gave no peak confirmed that this powder was a glass powder. A slurry was prepared by kneading 90 weight parts of this glass powder (lithium ion-occlusion material), 5 weight parts of natural graphite (conductive agent) and an N-methyl-2-pyrrolidone (NMP) solution of 5 weight parts of polyvinylidene fluoride. This slurry was applied to both sides of a copper foil (current collector) by the doctor blade method, The subsequent drying under vacuum at 100° C. for 2 hours gave a negative electrode.

Preparation of nonaqueous electrolyte solution

A nonaqueous electrolyte solution was prepared by dissolving $LiPF_6$ in a mixed solvent composed of ethylene carbonate and diethyl carbonate (volume ratio 1:1) to a concentration of 1 mole/liter.

Fabrication of comparative battery AC1

A comparative battery AC1 was fabricated in the same manner as in the fabrication of first battery A1 except that SnO (modifier oxide) was used in lieu of $B_2O_3$ in preparing the negative electrode.

Discharge capacity of each battery in the first cycle and capacity maintenance thereof in the 500th cycle Each battery was subjected to charge-discharge cycle testing. Each cycle consisted of charging to 4.2 V at a constant current of 1,000 mA and discharging to 2.75 V at a constant current of 1,000 mA. Each battery was evaluated for its discharge capacity (mAh) in the first cycle and for the capacity maintenance (%) in the 500th cycle as defined below. The results are shown in Table 1.

Capacity maintenance (%)=(discharge capacity in 500th cycle/discharge capacity in 1st cycle)×100

TABLE 1

| Battery | Network-forming Oxide | Discharge Capacity (mAh) | Capacity Maintenance (%) |
| --- | --- | --- | --- |
| A1 | $B_2O_3$ | 1900 | 90 |
| AC1 | SnO | 1700 | 10 |

As shown in Table 1, the capacity maintenance in the 500th cycle of first battery A1 was as high as 90% while the capacity maintenance of comparative battery AC1 was as low as 10%. This fact indicates that first battery A1 is decidedly superior in charge-discharge cycle characteristics to comparative battery AC1. Furthermore, first battery A1 shows a larger discharge capacity as compared with comparative battery AC1.

Experiment 2

In this experiment, second batteries B1 to B14 in which the lithium ion-occlusion material was an amorphous material composed of a network-forming oxide and a modifier oxide, and comparative batteries BC1 to BC14 in which the lithium ion-occlusion material was an amorphous material composed of two modifier oxides were fabricated and each was evaluated for its discharge capacity and charge-discharge cycle characteristics.

Fabrication of second batteries B1 to B14

A mixture of $B_2O_3$ and one of the modifier oxides shown in Table 2 in a molar ratio of 2:1 was melted by heating at 1,000° C. in a nitrogen gas atmosphere, then cooled gradually at a rate of 10° C./minute, and ground to give a glass powder (amorphous material) with a mean particle size of 10 μm. Second batteries B1 to B14 were fabricated in the same manner as in the fabrication of first battery A1 except that this glass powder was used in the preparation of the negative electrode.

Fabrication of comparative batteries BC1 to BC14

Comparative batteries BC1 to BC14 were fabricated in the same manner as in the fabrication of second batteries B1 to B14 except that a mixture of SnO and one of the modifier oxides shown in Table 2 in a molar ratio of 2:1 was used in the preparation of the negative electrode in lieu of the mixture of $B_2O_3$ and one of the modifier oxides shown in table 2.

Each of the above batteries was subjected to charge-discharge cycle testing under the same conditions as in Experiment 1 and the discharge capacity in the first cycle and the capacity maintenance in the 500th cycle were determined for each battery. The results are shown in Table 2.

TABLE 2

| Battery | Network-forming Oxide | Modifier Oxide | Discharge Capacity (mAh) | Capacity Maintenance (%) |
|---|---|---|---|---|
| B1 | $B_2O_3$ | $Sc_2O_3$ | 1950 | 90 |
| B2 | $B_2O_3$ | $La_2O_3$ | 1900 | 88 |
| B3 | $B_2O_3$ | $Y_2O_3$ | 1910 | 91 |
| B4 | $B_2O_3$ | MgO | 2000 | 85 |
| B5 | $B_2O_3$ | $Li_2O$ | 1900 | 88 |
| B6 | $B_2O_3$ | BaO | 2010 | 87 |
| B7 | $B_2O_3$ | CaO | 1950 | 88 |
| B8 | $B_2O_3$ | SrO | 1850 | 83 |
| B9 | $B_2O_3$ | $Na_2O$ | 1820 | 84 |
| B10 | $B_2O_3$ | $K_2O$ | 1850 | 83 |
| B11 | $B_2O_3$ | $MoO_2$ | 1830 | 86 |
| B12 | $B_2O_3$ | $WO_3$ | 1950 | 87 |
| B13 | $B_2O_3$ | $W_2O_5$ | 2050 | 90 |
| B14 | $B_2O_3$ | $Bi_2O_3$ | 1850 | 89 |
| BC1 | SnO | $Sc_2O_3$ | 1600 | 8 |
| BC2 | SnO | $La_2O_3$ | 1640 | 15 |
| BC3 | SnO | $Y_2O_3$ | 1650 | 13 |
| BC4 | SnO | MgO | 1670 | 9 |
| BC5 | SnO | $Li_2O$ | 1650 | 18 |
| BC6 | SnO | BaO | 1660 | 15 |
| BC7 | SnO | CaO | 1620 | 14 |
| BC8 | SnO | SrO | 1590 | 17 |
| BC9 | SnO | $Na_2O$ | 1570 | 16 |
| BC10 | SnO | $K_2O$ | 1550 | 8 |
| BC11 | SnO | $MoO_2$ | 1610 | 16 |
| BC12 | SnO | $WO_3$ | 1630 | 15 |
| BC13 | SnO | $W_2O_5$ | 1630 | 11 |
| BC14 | SnO | $Bi_2O_3$ | 1670 | 9 |

As shown in Table 2, second batteries B1 to B14 showed capacity maintenances as high as 83 to 91% in the 500th cycle whereas comparative batteries BC1 to BC14 showed capacity maintenances as low as 8 to 18% in the 500th cycle. This fact indicates that secondary batteries B1 to B14 are much better in charge-discharge cycle characteristics than comparative batteries BC1 to BC14. Furthermore, secondary batteries B1 to B14 showed larger discharge capacities as compared with comparative batteries BC1 to BC14.

Experiment 3

In this experiment, second batteries B15 to B20 in which the lithium ion-occlusion material was an amorphous material composed of a network-forming oxide and an intermediate oxide, and comparative batteries BC15 to BC20 in which the lithium ion-occlusion material was an amorphous material composed of a modifier oxide and an intermediate oxide were fabricated and each was evaluated for its discharge capacity and charge-discharge cycle characteristics.

Fabrication of second batteries B15 to B20

A mixture of $B_2O_3$ and one of the intermediate oxides shown in Table 3 in a molar ratio of 2:1 was melted by heating at 1,000° C. in a nitrogen gas atmosphere, then cooled gradually at a rate of 10° C./minute, and ground to give a glass powder (amorphous material) with a mean particle size of 10 μm. Second batteries B15 to B20 were fabricated in the same manner as in the fabrication of first battery A1 except that each glass powder obtained in the above manner was used in the preparation of the negative electrode.

Fabrication of comparative batteries BC15 to BC20

Comparative batteries BC15 to BC20 were fabricated in the same manner as in the fabrication of second batteries B15 to B20 except that, in the preparation of the negative electrode, a mixture of SnO and one of the intermediate oxides shown in Table 3 in a molar ratio of 2:1 was used in lieu of the mixture of $B_2O_3$ and one of the intermediate oxides shown in Table 3 in a molar ratio of 2:1.

The above batteries were each subjected to charge-discharge cycle testing under the same conditions as in Experiment 1 and the discharge capacity in the first cycle and the capacity maintenance in the 500th cycle were determined for each battery. The results are shown in Table 3.

TABLE 3

| Battery | Network-forming Oxide | Intermediate Oxide | Discharge Capacity (mAh) | Capacity Maintenance (%) |
|---|---|---|---|---|
| B15 | $B_2O_3$ | PbO | 1950 | 90 |
| B16 | $B_2O_3$ | ZnO | 1900 | 88 |
| B17 | $B_2O_3$ | $TiO_2$ | 1910 | 91 |
| B18 | $B_2O_3$ | $ZrO_2$ | 2000 | 85 |
| B19 | $B_2O_3$ | CdO | 1900 | 88 |
| B20 | $B_2O_3$ | $Al_2O_3$ | 2010 | 87 |
| BC15 | SnO | PbO | 1600 | 8 |
| BC16 | SnO | ZnO | 1640 | 15 |
| BC17 | SnO | $TiO_2$ | 1650 | 13 |
| BC18 | SnO | $ZrO_2$ | 1670 | 9 |
| BC19 | SnO | CdO | 1650 | 18 |
| BC20 | SnO | $Al_2O_3$ | 1660 | 15 |

As shown in Table 3, second batteries B15 to B20 showed high capacity maintenances of 85 to 91% in the 500th cycle whereas comparative batteries BC15 to BC20 showed very low capacity maintenances of 8 to 18% in the 500th cycle. This fact indicates that second batteries B15 to B20 are decidedly superior in charge-discharge cycle characteristics to comparative batteries BC15 to BC20. Furthermore, second batteries B15 to B20 showed larger discharge capacities as compared with comparative batteries BC15 to BC20.

Experiment 4

In this experiment, second batteries B21 to B38 in which the lithium ion-occlusion material was an amorphous material composed of a network-forming oxide, a modifier oxide and an intermediate oxide, and comparative batteries BC21 to BC38 in which the lithium ion-occlusion material was an amorphous material composed of two modifier oxides and an intermediate oxide were fabricated and each battery was evaluated for its discharge capacity and charge-discharge cycle characteristics.

Fabrication of second batteries B21 to B38

A mixture of $B_2O_3$ and the modifier oxide and intermediate oxide specified in Table 4 or 5 in a molar ratio of 2:1:1 was melted by heating at 1,000° C. in a nitrogen gas atmosphere, then cooled gradually at a rate of 10° C./minute, and ground to give a glass powder (amorphous material) with a mean particle size of 10 μm. Second batteries B21 to B38 were fabricated in the same manner as in the fabrication of first battery A1 except that each glass powder thus obtained was used in the preparation of the negative electrode.

Fabrication of comparative batteries BC21 to BC38

Comparative batteries BC21 to BC38 were fabricated in the same manner as in the fabrication of second batteries B21 to B38 except that, in the negative electrode preparation, a mixture of SnO and the modifier oxide and intermediate oxide specified in Table 4 or 5 in a molar ratio of 2:1:1 was used in lieu of the mixture of $B_2O_3$ and the modifier oxide and intermediate oxide specified in Table 4 or 5 in a molar ratio of 2:1:1.

Each battery was subjected to charge-discharge cycle testing in the same manner as in Experiment 1 and the discharge capacity in the first cycle and the capacity maintenance in the 500th cycle were determined for each battery. The results thus obtained are shown in Table 4 and Table 5.

TABLE 4

| Battery | Network-forming Oxide | Modifier Oxide | Intermediate Oxide | Discharge Capacity (mAh) | Capacity Maintenance (%) |
|---|---|---|---|---|---|
| B21 | $B_2O_3$ | $W_2O_5$ | PbO | 1950 | 90 |
| B22 | $B_2O_3$ | $W_2O_5$ | ZnO | 1900 | 88 |
| B23 | $B_2O_3$ | $W_2O_5$ | $TiO_2$ | 1910 | 91 |
| B24 | $B_2O_3$ | $W_2O_5$ | $ZrO_2$ | 2000 | 85 |
| B25 | $B_2O_3$ | $W_2O_5$ | CdO | 1900 | 88 |
| B26 | $B_2O_3$ | $W_2O_5$ | $Al_2O_3$ | 2010 | 87 |
| BC21 | SnO | $W_2O_5$ | PbO | 1600 | 8 |
| BC22 | SnO | $W_2O_5$ | ZnO | 1640 | 15 |
| BC23 | SnO | $W_2O_5$ | $TiO_2$ | 1650 | 13 |
| BC24 | SnO | $W_2O_5$ | $ZrO_2$ | 1670 | 9 |
| BC25 | SnO | $W_2O_5$ | CdO | 1650 | 18 |
| BC26 | SnO | $W_2O_5$ | $Al_2O_3$ | 1660 | 15 |
| B27 | $B_2O_3$ | $MoO_2$ | PbO | 1900 | 90 |
| B28 | $B_2O_3$ | $MoO_2$ | ZnO | 1850 | 88 |
| B29 | $B_2O_3$ | $MoO_2$ | $TiO_2$ | 1860 | 91 |
| B30 | $B_2O_3$ | $MoO_2$ | $ZrO_2$ | 1960 | 85 |
| B31 | $B_2O_3$ | $MoO_2$ | CdO | 1830 | 88 |
| B32 | $B_2O_3$ | $MoO_2$ | $Al_2O_3$ | 2000 | 87 |
| BC27 | SnO | $MoO_2$ | PbO | 1400 | 8 |
| BC28 | SnO | $MoO_2$ | ZnO | 1340 | 15 |
| BC29 | SnO | $MoO_2$ | $TiO_2$ | 1250 | 13 |
| BC30 | SnO | $MoO_2$ | $ZrO_2$ | 1370 | 9 |
| BC31 | SnO | $MoO_2$ | CdO | 1350 | 18 |
| BC32 | SnO | $MoO_2$ | $Al_2O_3$ | 1360 | 15 |

TABLE 5

| Battery | Network-forming Oxide | Modifier Oxide | Intermediate Oxide | Discharge Capacity (mAh) | Capacity Maintenance (%) |
|---|---|---|---|---|---|
| B33 | $B_2O_3$ | $Bi_2O_3$ | PbO | 1910 | 90 |
| B34 | $B_2O_3$ | $Bi_2O_3$ | ZnO | 1860 | 88 |
| B35 | $B_2O_3$ | $Bi_2O_3$ | $TiO_2$ | 1880 | 91 |
| B36 | $B_2O_3$ | $Bi_2O_3$ | $ZrO_2$ | 1900 | 85 |
| B37 | $B_2O_3$ | $Bi_2O_3$ | CdO | 1870 | 88 |
| B38 | $B_2O_3$ | $Bi_2O_3$ | $Al_2O_3$ | 2020 | 87 |
| BC33 | SnO | $Bi_2O_3$ | PbO | 1430 | 8 |
| BC34 | SnO | $Bi_2O_3$ | ZnO | 1370 | 15 |
| BC35 | SnO | $Bi_2O_3$ | $TiO_2$ | 1340 | 14 |
| BC36 | SnO | $Bi_2O_3$ | $ZrO_2$ | 1400 | 9 |
| BC37 | SnO | $Bi_2O_3$ | CdO | 1350 | 18 |
| BC38 | SnO | $Bi_2O_3$ | $Al_2O_3$ | 1390 | 15 |

As shown in Table 4 and Table 5, second batteries B21 to B38 showed high capacity maintenances as high as 85 to 91% in the 500th cycle, whereas comparative batteries BC21 to BC38 showed very low capacity maintenances of 8 to 18% in the 500th cycle. This fact indicates that second batteries B21 to B38 are decidedly superior in charge-discharge cycle characteristics to comparative batteries BC21 to BC38. Furthermore, second batteries B21 to B38 showed larger discharge capacities as compared with comparative batteries BC21 to BC38.

Experiment 5

In this experiment, second batteries B39 to B94 in which the lithium ion-occlusion material was an amorphous material composed of a network-forming oxide and a modifier oxide as well as second batteries B95 to B166 in which the lithium ion-occlusion material was an amorphous material composed of a network-forming oxide, a modifier oxide and an intermediate oxide were fabricated. Based on the data on discharge capacities and on 500th cycle capacity maintenances as obtained with these batteries, an optimal content of the oxide whose cation-oxygen bond strength is smaller than 335 kJ/mole to be contained in the amorphous material for use in the seconds battery was determined.

Fabrication of second batteries B39 to B94

A mixture of $B_2O_3$ and one of the modifier oxides shown in Table 6 or Table 7 in a molar ratio of 1;1, 3:7, 1:9 or 9:91 was melted by heating at 1,000° C. in a nitrogen gas atmosphere, then cooled gradually at a rate of 10° C./minute, and ground to give a glass powder (amorphous material) with a mean particle size of 10 μm. Second batteries B39 to B94 were fabricated in the same manner as in the fabrication of first battery A1 except that each glass powder obtained in the above manner was used in the preparation of the negative electrode.

Fabrication of second batteries B95 to B166

A mixture of $B_2O_3$ and the modifier oxide and intermediate oxide shown in Table 8, Table 9 or Table 10 in a molar ratio of 1:1 1, 1:2:2, 2:9:9 or 9:45:46 was melted by heating at 1,000° C. in a nitrogen gas atmosphere, then cooled gradually at a rate of 10° C./minute, and ground to give a glass powder (amorphous material) with a mean particle size of 10 μm. Second batteries B95 to B166 were fabricated in the same manner as in the fabrication of first battery A1 except that each glass powder obtained in the above manner was used in the preparation of the negative electrode.

Each battery was subjected to charge-discharge cycle testing under the same conditions as in Experiment 1 and the discharge capacity in the first cycle and the capacity maintenance in the 500th cycle were determined for each battery. The results are shown in Tables 6 to 10.

TABLE 6

| Battery | Network-forming Oxide X | Modifier Oxide Y | Molar Ratio X:Y | Discharge Capacity (mAh) | Capacity Maintenance (%) |
|---|---|---|---|---|---|
| B39 | $B_2O_3$ | $Sc_2O_3$ | 1:1 | 1940 | 91 |
| B40 | $B_2O_3$ | $Sc_2O_3$ | 3:7 | 1945 | 92 |
| B41 | $B_2O_3$ | $Sc_2O_3$ | 1:9 | 1940 | 90 |
| B42 | $B_2O_3$ | $Sc_2O_3$ | 9:91 | 1850 | 80 |
| B43 | $B_2O_3$ | $La_2O_3$ | 1:1 | 1905 | 89 |
| B44 | $B_2O_3$ | $La_2O_3$ | 3:7 | 1899 | 88 |
| B45 | $B_2O_3$ | $La_2O_3$ | 1:9 | 1897 | 87 |
| B46 | $B_2O_3$ | $La_2O_3$ | 9:91 | 1730 | 75 |
| B47 | $B_2O_3$ | $Y_2O_3$ | 1:1 | 1910 | 91 |
| B48 | $B_2O_3$ | $Y_2O_3$ | 3:7 | 1905 | 90 |
| B49 | $B_2O_3$ | $Y_2O_3$ | 1:9 | 1911 | 92 |
| B50 | $B_2O_3$ | $Y_2O_3$ | 9:91 | 1800 | 81 |
| B51 | $B_2O_3$ | MgO | 1:1 | 2000 | 85 |
| B52 | $B_2O_3$ | MgO | 3:7 | 1999 | 86 |
| B53 | $B_2O_3$ | MgO | 1:9 | 1995 | 83 |
| B54 | $B_2O_3$ | MgO | 9:91 | 1910 | 71 |
| B55 | $B_2O_3$ | $Li_2O$ | 1:1 | 1900 | 88 |
| B56 | $B_2O_3$ | $Li_2O$ | 3:7 | 1899 | 89 |
| B57 | $B_2O_3$ | $Li_2O$ | 1:9 | 1901 | 87 |
| B58 | $B_2O_3$ | $Li_2O$ | 9:91 | 1801 | 75 |
| B59 | $B_2O_3$ | BaO | 1:1 | 2011 | 89 |
| B60 | $B_2O_3$ | BaO | 3:7 | 2015 | 86 |
| B61 | $B_2O_3$ | BaO | 1:9 | 2009 | 88 |
| B62 | $B_2O_3$ | BaO | 9:91 | 1905 | 76 |
| B63 | $B_2O_3$ | CaO | 1:1 | 1950 | 88 |
| B64 | $B_2O_3$ | CaO | 3:7 | 1955 | 89 |
| B65 | $B_2O_3$ | CaO | 1:9 | 1937 | 87 |
| B66 | $B_2O_3$ | CaO | 9:91 | 1805 | 77 |

TABLE 7

| Battery | Network-forming Oxide X | Modifier Oxide Y | Molar Ratio X:Y | Discharge Capacity (mAh) | Capacity Maintenance (%) |
|---|---|---|---|---|---|
| B67 | $B_2O_3$ | SrO | 1:1 | 1856 | 82 |
| B68 | $B_2O_3$ | SrO | 3:7 | 1855 | 83 |
| B69 | $B_2O_3$ | SrO | 1:9 | 1849 | 84 |
| B70 | $B_2O_3$ | SrO | 9:91 | 1745 | 73 |
| B71 | $B_2O_3$ | $Na_2O$ | 1:1 | 1821 | 85 |
| B72 | $B_2O_3$ | $Na_2O$ | 3:7 | 1822 | 84 |
| B73 | $B_2O_3$ | $Na_2O$ | 1:9 | 1825 | 83 |
| B74 | $B_2O_3$ | $Na_2O$ | 9:91 | 1701 | 72 |
| B75 | $B_2O_3$ | $K_2O$ | 1:1 | 1849 | 83 |
| B76 | $B_2O_3$ | $K_2O$ | 3:7 | 1850 | 82 |
| B77 | $B_2O_3$ | $K_2O$ | 1:9 | 1853 | 85 |
| B78 | $B_2O_3$ | $K_2O$ | 9:91 | 1745 | 71 |
| B79 | $B_2O_3$ | $MoO_2$ | 1:1 | 1832 | 87 |
| B80 | $B_2O_3$ | $MoO_2$ | 3:7 | 1835 | 85 |
| B81 | $B_2O_3$ | $MoO_2$ | 1:9 | 1830 | 84 |
| B82 | $B_2O_3$ | $MoO_2$ | 9:91 | 1740 | 75 |
| B83 | $B_2O_3$ | $WO_3$ | 1:1 | 1951 | 87 |
| B84 | $B_2O_3$ | $WO_3$ | 3:7 | 1955 | 86 |
| B85 | $B_2O_3$ | $WO_3$ | 1:9 | 1950 | 86 |
| B86 | $B_2O_3$ | $WO_3$ | 9:91 | 1855 | 73 |
| B87 | $B_2O_3$ | $W_2O_5$ | 1:1 | 2051 | 90 |
| B88 | $B_2O_3$ | $W_2O_5$ | 3:7 | 2045 | 91 |
| B89 | $B_2O_3$ | $W_2O_5$ | 1:9 | 2051 | 90 |
| B90 | $B_2O_3$ | $W_2O_5$ | 9:91 | 1951 | 81 |
| B91 | $B_2O_3$ | $Bi_2O_3$ | 1:1 | 1850 | 88 |
| B92 | $B_2O_3$ | $Bi_2O_3$ | 3:7 | 1853 | 87 |
| B93 | $B_2O_3$ | $Bi_2O_3$ | 1:9 | 1850 | 89 |
| B94 | $B_2O_3$ | $Bi_2O_3$ | 9:91 | 1743 | 78 |

TABLE 8

| Battery | Network-forming Oxide X | Modifier Oxide Y | Intermediate Oxide Z | Molar Ratio X:Y:Z | Discharge Capacity (mAh) | Capacity Maintenance (%) |
|---|---|---|---|---|---|---|
| B95 | $B_2O_3$ | $W_2O_5$ | PbO | 1:1:1 | 1950 | 90 |
| B96 | $B_2O_3$ | $W_2O_5$ | PbO | 1:2:2 | 1949 | 91 |
| B97 | $B_2O_3$ | $W_2O_5$ | PbO | 2:9:9 | 1940 | 90 |
| B98 | $B_2O_3$ | $W_2O_5$ | PbO | 9:45:46 | 1830 | 78 |
| B99 | $B_2O_3$ | $W_2O_5$ | ZnO | 1:1:1 | 1900 | 87 |
| B100 | $B_2O_3$ | $W_2O_5$ | ZnO | 1:2:2 | 1890 | 88 |
| B101 | $B_2O_3$ | $W_2O_5$ | ZnO | 2:9:9 | 1899 | 86 |
| B102 | $B_2O_3$ | $W_2O_5$ | ZnO | 9:45:46 | 1800 | 75 |
| B103 | $B_2O_3$ | $W_2O_5$ | $TiO_2$ | 1:1:1 | 1910 | 92 |
| B104 | $B_2O_3$ | $W_2O_5$ | $TiO_2$ | 1:2:2 | 1912 | 91 |
| B105 | $B_2O_3$ | $W_2O_5$ | $TiO_2$ | 2:9:9 | 1911 | 90 |
| B106 | $B_2O_3$ | $W_2O_5$ | $TiO_2$ | 9:45:46 | 1811 | 81 |
| B107 | $B_2O_3$ | $W_2O_5$ | $ZrO_2$ | 1:1:1 | 2000 | 84 |
| B108 | $B_2O_3$ | $W_2O_5$ | $ZrO_2$ | 1:2:2 | 2001 | 86 |
| B109 | $B_2O_3$ | $W_2O_5$ | $ZrO_2$ | 2:9:9 | 1998 | 83 |
| B110 | $B_2O_3$ | $W_2O_5$ | $ZrO_2$ | 9:45:46 | 1900 | 71 |
| B111 | $B_2O_3$ | $W_2O_5$ | CdO | 1:1:1 | 1901 | 87 |
| B112 | $B_2O_3$ | $W_2O_5$ | CdO | 1:2:2 | 1910 | 88 |
| B113 | $B_2O_3$ | $W_2O_5$ | CdO | 2:9:9 | 1900 | 89 |
| B114 | $B_2O_3$ | $W_2O_5$ | CdO | 9:45:46 | 1801 | 79 |
| B115 | $B_2O_3$ | $W_2O_5$ | $Al_2O_3$ | 1:1:1 | 2011 | 86 |
| B116 | $B_2O_3$ | $W_2O_5$ | $Al_2O_3$ | 1:2:2 | 2009 | 88 |
| B117 | $B_2O_3$ | $W_2O_5$ | $Al_2O_3$ | 2:9:9 | 2012 | 85 |
| B118 | $B_2O_3$ | $W_2O_5$ | $Al_2O_3$ | 9:45:46 | 1900 | 74 |

TABLE 9

| Battery | Network-forming Oxide X | Modifier Oxide Y | Intermediate Oxide Z | Molar Ratio X:Y:Z | Discharge Capacity (mAh) | Capacity Maintenance (%) |
|---|---|---|---|---|---|---|
| B119 | $B_2O_3$ | $MoO_2$ | PbO | 1:1:1 | 1901 | 91 |
| B120 | $B_2O_3$ | $MoO_2$ | PbO | 1:2:2 | 1900 | 92 |
| B121 | $B_2O_3$ | $MoO_2$ | PbO | 2:9:9 | 1899 | 90 |

TABLE 9-continued

| Battery | Network-forming Oxide X | Modifier Oxide Y | Intermediate Oxide Z | Molar Ratio X:Y:Z | Discharge Capacity (mAh) | Capacity Maintenance (%) |
|---|---|---|---|---|---|---|
| B122 | $B_2O_3$ | $MoO_2$ | PbO | 9:45:46 | 1800 | 80 |
| B123 | $B_2O_3$ | $MoO_2$ | ZnO | 1:1:1 | 1845 | 87 |
| B124 | $B_2O_3$ | $MoO_2$ | ZnO | 1:2:2 | 1850 | 88 |
| B125 | $B_2O_3$ | $MoO_2$ | ZnO | 2:9:9 | 1840 | 89 |
| B126 | $B_2O_3$ | $MoO_2$ | ZnO | 9:45:46 | 1720 | 79 |
| B127 | $B_2O_3$ | $MoO_2$ | $TiO_2$ | 1:1:1 | 1862 | 91 |
| B128 | $B_2O_3$ | $MoO_2$ | $TiO_2$ | 1:2:2 | 1857 | 90 |
| B129 | $B_2O_3$ | $MoO_2$ | $TiO_2$ | 2:9:9 | 1860 | 89 |
| B130 | $B_2O_3$ | $MoO_2$ | $TiO_2$ | 9:45:46 | 1750 | 79 |
| B131 | $B_2O_3$ | $MoO_2$ | $ZrO_2$ | 1:1:1 | 1961 | 86 |
| B132 | $B_2O_3$ | $MoO_2$ | $ZrO_2$ | 1:2:2 | 1955 | 85 |
| B133 | $B_2O_3$ | $MoO_2$ | $ZrO_2$ | 2:9:9 | 1965 | 86 |
| B134 | $B_2O_3$ | $MoO_2$ | $ZrO_2$ | 9:45:46 | 1855 | 75 |
| B135 | $B_2O_3$ | $MoO_2$ | CdO | 1:1:1 | 1831 | 88 |
| B136 | $B_2O_3$ | $MoO_2$ | CdO | 1:2:2 | 1835 | 86 |
| B137 | $B_2O_3$ | $MoO_2$ | CdO | 2:9:9 | 1832 | 85 |
| B138 | $B_2O_3$ | $MoO_2$ | CdO | 9:45:46 | 1732 | 73 |
| B139 | $B_2O_3$ | $MoO_2$ | $Al_2O_3$ | 1:1:1 | 2001 | 86 |
| B140 | $B_2O_3$ | $MoO_2$ | $Al_2O_3$ | 1:2:2 | 2005 | 88 |
| B141 | $B_2O_3$ | $MoO_2$ | $Al_2O_3$ | 2:9:9 | 2000 | 85 |
| B142 | $B_2O_3$ | $MoO_2$ | $Al_2O_3$ | 9:45:46 | 1900 | 73 |

TABLE 10

| Battery | Network-forming Oxide X | Modifier Oxide Y | Intermediate Oxide Z | Molar Ratio X:Y:Z | Discharge Capacity (mAh) | Capacity Maintenance (%) |
|---|---|---|---|---|---|---|
| B143 | $B_2O_3$ | $Bi_2O_3$ | PbO | 1:1:1 | 1911 | 91 |
| B144 | $B_2O_3$ | $Bi_2O_3$ | PbO | 1:2:2 | 1905 | 90 |
| B145 | $B_2O_3$ | $Bi_2O_3$ | PbO | 2:9:9 | 1909 | 89 |
| B146 | $B_2O_3$ | $Bi_2O_3$ | PbO | 9:45:46 | 1812 | 79 |
| B147 | $B_2O_3$ | $Bi_2O_3$ | ZnO | 1:1:1 | 1865 | 87 |
| B148 | $B_2O_3$ | $Bi_2O_3$ | ZnO | 1:2:2 | 1863 | 86 |
| B149 | $B_2O_3$ | $Bi_2O_3$ | ZnO | 2:9:9 | 1862 | 88 |
| B150 | $B_2O_3$ | $Bi_2O_3$ | ZnO | 9:45:46 | 1765 | 75 |
| B151 | $B_2O_3$ | $Bi_2O_3$ | $TiO_2$ | 1:1:1 | 1882 | 92 |
| B152 | $B_2O_3$ | $Bi_2O_3$ | $TiO_2$ | 1:2:2 | 1879 | 91 |
| B153 | $B_2O_3$ | $Bi_2O_3$ | $TiO_2$ | 2:9:9 | 1881 | 90 |
| B154 | $B_2O_3$ | $Bi_2O_3$ | $TiO_2$ | 9:45:46 | 1782 | 80 |
| B155 | $B_2O_3$ | $Bi_2O_3$ | $ZrO_2$ | 1:1:1 | 1901 | 84 |
| B156 | $B_2O_3$ | $Bi_2O_3$ | $ZrO_2$ | 1:2:2 | 1899 | 85 |
| B157 | $B_2O_3$ | $Bi_2O_3$ | $ZrO_2$ | 2:9:9 | 1895 | 83 |
| B158 | $B_2O_3$ | $Bi_2O_3$ | $ZrO_2$ | 9:45:46 | 1794 | 70 |
| B159 | $B_2O_3$ | $Bi_2O_3$ | CdO | 1:1:1 | 1872 | 87 |
| B160 | $B_2O_3$ | $Bi_2O_3$ | CdO | 1:2:2 | 1871 | 88 |
| B161 | $B_2O_3$ | $Bi_2O_3$ | CdO | 2:9:9 | 1875 | 89 |
| B162 | $B_2O_3$ | $Bi_2O_3$ | CdO | 9:45:46 | 1773 | 76 |
| B163 | $B_2O_3$ | $Bi_2O_3$ | $Al_2O_3$ | 1:1:1 | 2021 | 88 |
| B164 | $B_2O_3$ | $Bi_2O_3$ | $Al_2O_3$ | 1:2:2 | 2017 | 89 |
| B165 | $B_2O_3$ | $Bi_2O_3$ | $Al_2O_3$ | 2:9:9 | 2021 | 86 |
| B166 | $B_2O_3$ | $Bi_2O_3$ | $Al_2O_3$ | 9:45:46 | 1900 | 73 |

From Tables 6 to 10, it is seen that, in the second battery, the proportion of the oxide whose cation-oxygen bond strength is smaller than 335 kJ/mole per mole part of $B_2O_3$ should preferably be not higher than 9 mole parts.

Experiment 6

In this experiment, comparative batteries BC39 to BC44 in which the lithium ion-occlusion material was an amorphous material consisting of $GeO_2$, $SiO_2$, $P_2O_5$, $As_2O_3$, $Sb_2O_3$ or $V_2O_5$ (each being a network-forming oxide) were fabricated and each of these batteries was evaluated for its discharge capacity and charge-discharge cycle characteristics.

Comparative batteries BC39 to BC44 were fabricated in the same manner as in the fabrication of first battery A1 except that $GeO_2$, $SiO_2$, $P_2O_5$, $As_2O_3$, $Sb_2O_3$ or $V_2O_5$ was used in lieu of $B_2O_3$ in the preparation of the negative electrode.

Each battery was subjected to charge-discharge cycle testing under the same conditions as in Experiment 1 and the discharge capacity in the first cycle and the capacity maintenance in the 500th cycle were determined for each battery. The results are shown in Table 11.

TABLE 11

| Battery | Network-forming Oxide | Discharge Capacity (mAh) | Capacity Maintenance (%) |
|---|---|---|---|
| BC39 | $GeO_2$ | 1500 | 7 |
| BC40 | $SiO_2$ | 1650 | 10 |
| BC41 | $P_2O_5$ | 500 | 3 |
| BC42 | $As_2O_3$ | 300 | 8 |
| BC43 | $Sb_2O_3$ | 700 | 2 |
| BC44 | $V_2O_5$ | 1000 | 9 |

As shown in Table 11, comparative batteries BC39 to BC44 were much smaller in discharge capacity and capacity maintenance as compared with first battery A1. This fact indicates that even if an amorphous material comprising $GeO_2$, $SiO_2$, $P_2O_5$, $As_2O_3$, $Sb_2O_3$ or $V_2O_5$ is used as the lithium ion-occlusion material in lieu of the amorphous material comprising $B_2O_3$ in the first battery, lithium secondary batteries having good characteristics can never be obtained.

Experiment 7

In this experiment, comparative batteries BC45 to BC128 in which the lithium ion-occlusion material was an amorphous material composed of $GeO_2$, $SiO_2$, $P_2O_5$, $As_2O_3$, $Sb_2O_3$ or $V_2O_5$ and a modifier oxide were fabricated and each of these batteries was evaluated for its discharge capacity and charge-discharge cycle characteristics.

Comparative batteries BC45 to BC128 were fabricated in the same manner as in the fabrication of second batteries B1 to B14 except that, in the negative electrode preparation, $GeO_2$, $SiO_2$, $P_2O_5$, $As_2O_3$, $Sb_2O_3$ or $V_2O_5$ was used in lieu of $B_2O_3$.

Each battery was subjected to charge-discharge cycle testing under the same conditions as in Experiment 1 and the discharge capacity in the first cycle and the capacity maintenance in the 500th cycle were determined for each battery. The results are shown in Tables 12, 13 and 14.

TABLE 12

| Battery | Network-forming Oxide | Modifier Oxide | Discharge Capacity (mAh) | Capacity Maintenance (%) |
|---|---|---|---|---|
| BC45 | $GeO_2$ | $Sc_2O_3$ | 1500 | 5 |
| BC46 | $GeO_2$ | $La_2O_3$ | 1540 | 12 |
| BC47 | $GeO_2$ | $Y_2O_3$ | 1550 | 10 |
| BC48 | $GeO_2$ | $MgO$ | 1570 | 6 |
| BC49 | $GeO_2$ | $Li_2O$ | 1550 | 15 |
| BC50 | $GeO_2$ | $BaO$ | 1560 | 12 |
| BC51 | $GeO_2$ | $CaO$ | 1520 | 11 |
| BC52 | $GeO_2$ | $SrO$ | 1490 | 14 |
| BC53 | $GeO_2$ | $Na_2O$ | 1470 | 13 |
| BC54 | $GeO_2$ | $K_2O$ | 1450 | 5 |
| BC55 | $GeO_2$ | $MoO_2$ | 1510 | 13 |
| BC56 | $GeO_2$ | $WO_3$ | 1530 | 12 |
| BC57 | $GeO_2$ | $W_2O_5$ | 1530 | 8 |
| BC58 | $GeO_2$ | $Bi_2O_3$ | 1570 | 6 |
| BC59 | $SiO_2$ | $Sc_2O_3$ | 1550 | 8 |
| BC60 | $SiO_2$ | $La_2O_3$ | 1590 | 15 |
| BC61 | $SiO_2$ | $Y_2O_3$ | 1600 | 13 |
| BC62 | $SiO_2$ | $MgO$ | 1620 | 9 |
| BC63 | $SiO_2$ | $Li_2O$ | 1600 | 18 |
| BC64 | $SiO_2$ | $BaO$ | 1610 | 15 |
| BC65 | $SiO_2$ | $CaO$ | 1570 | 14 |
| BC66 | $SiO_2$ | $SrO$ | 1540 | 17 |
| BC67 | $SiO_2$ | $Na_2O$ | 1520 | 16 |
| BC68 | $SiO_2$ | $K_2O$ | 1500 | 8 |
| BC69 | $SiO_2$ | $MoO_2$ | 1560 | 16 |
| BC70 | $SiO_2$ | $WO_3$ | 1580 | 15 |
| BC71 | $SiO_2$ | $W_2O_5$ | 1580 | 11 |
| BC72 | $SiO_2$ | $Bi_2O_3$ | 1620 | 9 |

TABLE 13

| Battery | Network-forming Oxide | Modifier Oxide | Discharge Capacity (mAh) | Capacity Maintenance (%) |
|---|---|---|---|---|
| BC73 | $P_2O_5$ | $Sc_2O_3$ | 550 | 1 |
| BC74 | $P_2O_5$ | $La_2O_3$ | 640 | 8 |
| BC75 | $P_2O_5$ | $Y_2O_3$ | 650 | 6 |
| BC76 | $P_2O_5$ | $MgO$ | 670 | 2 |
| BC77 | $P_2O_5$ | $Li_2O$ | 650 | 11 |
| BC78 | $P_2O_5$ | $BaO$ | 660 | 8 |
| BC79 | $P_2O_5$ | $CaO$ | 620 | 7 |
| BC80 | $P_2O_5$ | $SrO$ | 590 | 10 |
| BC81 | $P_2O_5$ | $Na_2O$ | 570 | 9 |
| BC82 | $P_2O_5$ | $K_2O$ | 550 | 1 |
| BC83 | $P_2O_5$ | $MoO_2$ | 610 | 9 |
| BC84 | $P_2O_5$ | $WO_3$ | 630 | 8 |
| BC85 | $P_2O_5$ | $W_2O_5$ | 630 | 4 |
| BC86 | $P_2O_5$ | $Bi_2O_3$ | 670 | 2 |
| BC87 | $As_2O_3$ | $Sc_2O_3$ | 300 | 6 |
| BC88 | $As_2O_3$ | $La_2O_3$ | 340 | 13 |
| BC89 | $As_2O_3$ | $Y_2O_3$ | 350 | 11 |
| BC90 | $As_2O_3$ | $MgO$ | 370 | 7 |
| BC91 | $As_2O_3$ | $Li_2O$ | 350 | 16 |
| BC92 | $As_2O_3$ | $BaO$ | 360 | 13 |
| BC93 | $As_2O_3$ | $CaO$ | 320 | 12 |
| BC94 | $As_2O_3$ | $SrO$ | 290 | 15 |
| BC95 | $As_2O_3$ | $Na_2O$ | 270 | 14 |
| BC96 | $As_2O_3$ | $K_2O$ | 250 | 6 |
| BC97 | $As_2O_3$ | $MoO_2$ | 310 | 14 |
| BC98 | $As_2O_3$ | $WO_3$ | 330 | 13 |
| BC99 | $As_2O_3$ | $W_2O_5$ | 330 | 9 |
| BC100 | $As_2O_3$ | $Bi_2O_3$ | 370 | 7 |

TABLE 14

| Battery | Network-forming Oxide | Modifier Oxide | Discharge Capacity (mAh) | Capacity Maintenance (%) |
|---|---|---|---|---|
| BC101 | $Sb_2O_3$ | $Sc_2O_3$ | 600 | 1 |
| BC102 | $Sb_2O_3$ | $La_2O_3$ | 640 | 7 |
| BC103 | $Sb_2O_3$ | $Y_2O_3$ | 650 | 5 |
| BC104 | $Sb_2O_3$ | $MgO$ | 670 | 1 |
| BC105 | $Sb_2O_3$ | $Li_2O$ | 650 | 10 |
| BC106 | $Sb_2O_3$ | $BaO$ | 660 | 7 |
| BC107 | $Sb_2O_3$ | $CaO$ | 620 | 6 |
| BC108 | $Sb_2O_3$ | $SrO$ | 590 | 9 |
| BC109 | $Sb_2O_3$ | $Na_2O$ | 570 | 8 |
| BC110 | $Sb_2O_3$ | $K_2O$ | 550 | 1 |
| BC111 | $Sb_2O_3$ | $MoO_2$ | 610 | 8 |
| BC112 | $Sb_2O_3$ | $WO_3$ | 630 | 7 |
| BC113 | $Sb_2O_3$ | $W_2O_5$ | 630 | 3 |
| BC114 | $Sb_2O_3$ | $Bi_2O_3$ | 670 | 1 |
| BC115 | $V_2O_5$ | $Sc_2O_3$ | 900 | 6 |
| BC116 | $V_2O_5$ | $La_2O_3$ | 940 | 13 |
| BC117 | $V_2O_5$ | $Y_2O_3$ | 950 | 11 |
| BC118 | $V_2O_5$ | $MgO$ | 970 | 7 |
| BC119 | $V_2O_5$ | $Li_2O$ | 950 | 16 |
| BC120 | $V_2O_5$ | $BaO$ | 960 | 13 |
| BC121 | $V_2O_5$ | $CaO$ | 920 | 12 |
| BC122 | $V_2O_5$ | $SrO$ | 890 | 15 |
| BC123 | $V_2O_5$ | $Na_2O$ | 870 | 14 |
| BC124 | $V_2O_5$ | $K_2O$ | 850 | 6 |
| BC125 | $V_2O_5$ | $MoO_2$ | 910 | 14 |

TABLE 14-continued

| Battery | Network-forming Oxide | Modifier Oxide | Discharge Capacity (mAh) | Capacity Maintenance (%) |
|---|---|---|---|---|
| BC126 | $V_2O_5$ | $WO_3$ | 930 | 13 |
| BC127 | $V_2O_5$ | $W_2O_5$ | 930 | 9 |
| BC128 | $V_2O_5$ | $Bi_2O_3$ | 970 | 7 |

As shown in Tables 12 to 14, comparative batteries BC45 to BC128 were much smaller in discharge capacity and capacity maintenance as compared with second batteries B1 to B14. This fact indicates that even if an amorphous material composed of $GeO_2$, $SiO_2$, $P_2O_5$, $As_2O_3$, $Sb_2O_3$ or $V_2O_5$ and a modifier oxide is used as the lithium ion-occlusion material in lieu the amorphous material composed of B20, and a modifier oxide in the second battery, lithium secondary batteries having good characteristics can never be obtained.

Experiment 8

In this experiment, comparative batteries BC129 to BC164 in which the lithium ion-occlusion material was an amorphous material composed of $GeO_2$, $SiO_2$, $P_2O_5$, $As_2O_3$, $Sb_2O_3$ or $V_2O_5$ and an intermediate oxide were fabricated and each of these batteries was evaluated for its discharge capacity and charge-discharge cycle characteristics.

Comparative batteries BC129 to BC164 were fabricated in the same manner as in the fabrication of second batteries B15 to B20 except that, in the preparation of the negative electrode, $GeO_2$, $SiO_2$, $P_2O_5$, $As_2O_3$, $Sb_2O_3$ or $V_2O_5$ was used in lieu of B20.

Each battery was subjected to charge-discharge cycle testing under the same conditions as in Experiment 1 and the discharge capacity in the first cycle and the capacity maintenance in the 500th cycle were determined for each battery. The results are shown in Tables 15 and 16.

TABLE 15

| Battery | Network-forming Oxide | Intermediate Oxide | Discharge Capacity (mAh) | Capacity Maintenance (%) |
|---|---|---|---|---|
| BC129 | $SiO_2$ | PbO | 1550 | 8 |
| BC130 | $SiO_2$ | ZnO | 1590 | 15 |
| BC131 | $SiO_2$ | $TiO_2$ | 1600 | 13 |
| BC132 | $SiO_2$ | $ZrO_2$ | 1620 | 9 |
| BC133 | $SiO_2$ | CdO | 1600 | 18 |
| BC134 | $SiO_2$ | $Al_2O_3$ | 1610 | 15 |
| BC135 | $GeO_2$ | PbO | 1400 | 5 |
| BC136 | $GeO_2$ | ZnO | 1440 | 12 |
| BC137 | $GeO_2$ | $TiO_2$ | 1450 | 10 |
| BC138 | $GeO_2$ | $ZrO_2$ | 1470 | 6 |
| BC139 | $GeO_2$ | CdO | 1450 | 15 |
| BC140 | $GeO_2$ | $Al_2O_3$ | 1460 | 12 |
| BC141 | $P_2O_5$ | PbO | 400 | 1 |
| BC142 | $P_2O_5$ | ZnO | 440 | 8 |
| BC143 | $P_2O_5$ | $TiO_2$ | 450 | 6 |
| BC144 | $P_2O_5$ | $ZrO_2$ | 470 | 2 |
| BC145 | $P_2O_5$ | CdO | 450 | 11 |
| BC146 | $P_2O_5$ | $Al_2O_3$ | 460 | 8 |

TABLE 16

| Battery | Network-forming Oxide | Intermediate Oxide | Discharge Capacity (mAh) | Capacity Maintenance (%) |
|---|---|---|---|---|
| BC147 | $As_2O_3$ | PbO | 200 | 6 |
| BC148 | $As_2O_3$ | ZnO | 240 | 13 |
| BC149 | $As_2O_3$ | $TiO_2$ | 250 | 11 |
| BC150 | $As_2O_3$ | $ZrO_2$ | 270 | 7 |
| BC151 | $As_2O_3$ | CdO | 250 | 16 |
| BC152 | $As_2O_3$ | $Al_2O_3$ | 260 | 13 |
| BC153 | $Sb_2O_3$ | PbO | 600 | 1 |
| BC154 | $Sb_2O_3$ | ZnO | 640 | 7 |
| BC155 | $Sb_2O_3$ | $TiO_2$ | 650 | 5 |
| BC156 | $Sb_2O_3$ | $ZrO_2$ | 670 | 1 |
| BC157 | $Sb_2O_3$ | CdO | 650 | 10 |
| BC158 | $Sb_2O_3$ | $Al_2O_3$ | 660 | 7 |
| BC159 | $V_2O_5$ | PbO | 900 | 7 |
| BC160 | $V_2O_5$ | ZnO | 940 | 14 |
| BC161 | $V_2O_5$ | $TiO_2$ | 950 | 12 |
| BC162 | $V_2O_5$ | $ZrO_2$ | 970 | 8 |
| BC163 | $V_2O_5$ | CdO | 950 | 17 |
| BC164 | $V_2O_5$ | $Al_2O_3$ | 960 | 14 |

As shown in Tables 15 and 16, comparative batteries BC129 to BC164 were much smaller in discharge capacity and capacity maintenance as compared with second batteries B15 to B20. This fact indicates that even if an amorphous material composed of $GeO_2$, $SiO_2$, $P_2O_5$, $As_2O_3$, $Sb_2O_3$ or $V_2O_5$ and an intermediate oxide is used as the lithium ion-occlusion material in lieu of the amorphous material composed of B203 and an intermediate oxide in the second battery, lithium secondary batteries having good characteristics can never be obtained.

Experiment 9

In this experiment, comparative batteries BC165 to BC195 in which the lithium ion-occlusion material was an amorphous material composed of $GeO_2$, $SiO_2$, $P_2O_5$, $As_2O_3$, $Sb_2O_3$ or $V_2O_5$, a modifier oxide and an intermediate oxide were fabricated and each of these batteries was evaluated for its discharge capacity and charge-discharge cycle characteristics.

Comparative batteries BC165 to BC194 were fabricated in the same manner as in the fabrication of second batteries B21 to B26 except that, in the preparation of the negative electrode, $GeO_2$, $SiO_2$, $P_2O_5$, $As_2O_3$, $Sb_2O_3$ or $V_2O_5$ was used in lieu of $B_2O_3$.

Each battery was subjected to charge-discharge cycle testing under the same conditions as in Experiment 1 and the discharge capacity in the first cycle and the capacity maintenance in the 500th cycle were determined for each battery. The results are shown in Tables 17 and 18.

TABLE 17

| Battery | Network-forming Oxide | Modifier Oxide | Intermediate Oxide | Discharge Capacity (mAh) | Capacity Maintenance (%) |
|---|---|---|---|---|---|
| BC165 | $SiO_2$ | $W_2O_5$ | PbO | 1550 | 8 |
| BC166 | $SiO_2$ | $W_2O_5$ | ZnO | 1590 | 15 |
| BC167 | $SiO_2$ | $W_2O_5$ | $TiO_2$ | 1600 | 13 |
| BC168 | $SiO_2$ | $W_2O_5$ | $ZrO_2$ | 1620 | 9 |
| BC169 | $SiO_2$ | $W_2O_5$ | CdO | 1600 | 18 |
| BC170 | $SiO_2$ | $W_2O_5$ | $Al_2O_3$ | 1610 | 15 |
| BC171 | $GeO_2$ | $W_2O_5$ | PbO | 1400 | 5 |
| BC172 | $GeO_2$ | $W_2O_5$ | ZnO | 1440 | 12 |
| BC173 | $GeO_2$ | $W_2O_5$ | $TiO_2$ | 1450 | 10 |
| BC174 | $GeO_2$ | $W_2O_5$ | $ZrO_2$ | 1470 | 6 |

TABLE 17-continued

| Battery | Network-forming Oxide | Modifier Oxide | Intermediate Oxide | Discharge Capacity (mAh) | Capacity Maintenance (%) |
|---|---|---|---|---|---|
| BC175 | $GeO_2$ | $W_2O_5$ | CdO | 1450 | 15 |
| BC176 | $GeO_2$ | $W_2O_5$ | $Al_2O_3$ | 1460 | 12 |

TABLE 18

| Battery | Network-forming Oxide | Modifier Oxide | Intermediate Oxide | Discharge Capacity (mAh) | Capacity Maintenance (%) |
|---|---|---|---|---|---|
| BC177 | $P_2O_5$ | $W_2O_5$ | PbO | 400 | 1 |
| BC178 | $P_2O_5$ | $W_2O_5$ | ZnO | 440 | 8 |
| BC179 | $P_2O_5$ | $W_2O_5$ | $TiO_2$ | 450 | 6 |
| BC180 | $P_2O_5$ | $W_2O_5$ | $ZrO_2$ | 470 | 2 |
| BC181 | $P_2O_5$ | $W_2O_5$ | CdO | 450 | 11 |
| BC182 | $P_2O_5$ | $W_2O_5$ | $Al_2O_3$ | 460 | 8 |
| BC183 | $As_2O_3$ | $W_2O_5$ | PbO | 200 | 6 |
| BC184 | $As_2O_3$ | $W_2O_5$ | ZnO | 240 | 13 |
| BC185 | $As_2O_3$ | $W_2O_5$ | $TiO_2$ | 250 | 11 |
| BC186 | $As_2O_3$ | $W_2O_5$ | $ZrO_2$ | 270 | 7 |
| BC187 | $As_2O_3$ | $W_2O_5$ | CdO | 250 | 16 |
| BC188 | $As_2O_3$ | $W_2O_5$ | $Al_2O_3$ | 260 | 13 |
| BC189 | $Sb_2O_3$ | $W_2O_5$ | PbO | 660 | 1 |
| BC190 | $Sb_2O_3$ | $W_2O_5$ | ZnO | 640 | 7 |
| BC191 | $Sb_2O_3$ | $W_2O_5$ | $TiO_2$ | 650 | 5 |
| BC192 | $Sb_2O_3$ | $W_2O_5$ | $ZrO_2$ | 670 | 1 |
| BC193 | $Sb_2O_3$ | $W_2O_5$ | CdO | 650 | 10 |
| BC194 | $Sb_2O_3$ | $W_2O_5$ | $Al_2O_3$ | 660 | 7 |

As shown in Tables 17 and 18, comparative batteries BC165 to BC194 were much smaller in discharge capacity and capacity maintenance as compared with second batteries B21 to B26. This fact indicates that even if an amorphous material composed of $GeO_2$, $SiO_2$, $P_2O_5$, $As_2O_3$, $Sb_2O_3$ or $V_2O_5$, a modifier oxide and an intermediate oxide is used as the lithium ion-occlusion material in lieu of the amorphous material composed of $B_2O_3$, a modifier oxide and an intermediate oxide in the second battery, lithium secondary batteries having good characteristics can never be obtained.

The present invention thus provides lithium secondary batteries having large discharge capacity and good charge-discharge cycle characteristics.

What is claimed is:

1. A lithium secondary battery comprising a positive electrode, a negative electrode comprising a lithium ion-occlusion material, and a nonaqueous electrolyte, the lithium ion-occlusion material being an amorphous material consisting essentially of $B_2O_3$.

2. A lithium secondary battery comprising a positive electrode, a negative electrode comprising a lithium ion-occlusion material, and a nonaqueous electrolyte, the lithium ion-occlusion material being an amorphous material consisting essentially of $B_2O_3$ and an oxide whose cation-oxygen bond strength is smaller than 335 kJ/mole.

3. The lithium secondary battery according to claim 2, wherein the oxide whose cation-oxygen bond strength is smaller than 335 kJ/mole consists essentially of at least one modifier oxide selected from the group consisting of $MoO_2$, $WO_3$, $W_2O_5$, $Bi_2O_3$, $Sc_2O_3$, $La_2O_3$, $Y_2O_3$, MgO, $Li_2O$, BaO, CaO, SrO, $Na_2O$ and $K_2O$.

4. The lithium secondary battery according to claim 2, wherein the oxide whose cation-oxygen bond strength is smaller than 335 kJ/mole consists essentially of at least one intermediate oxide selected from the group consisting of PbO, ZnO, CdO, $TiO_2$, $ZrO_2$ and $Al_2O_3$.

5. The lithium secondary battery according to claim 2, wherein the oxide whose cation-oxygen bond strength is smaller than 335 kJ/mole consists essentially of at least one modifier oxide selected from the group consisting of $MoO_2$, $WO_3$, $W_2O_5$, $Bi_2O_3$, $Sc_2O_3$, $La_2O_3$, $Y_2O_3$, MgO, $Li_2O$, BaO, CaO, SrO, $Na_2O$ and $K_2O$ and at least one intermediate oxide selected from the group consisting of PbO, ZnO, CdO, $TiO_2$, $ZrO_2$ and $Al_2O_3$.

6. The lithium secondary battery according to claim 2, wherein the amorphous material consists essentially of one mole part of B203 and not more than 9 mole parts of the oxide whose cation-oxygen bond strength is smaller than 335 kJ/mole.

7. A negative electrode for a lithium secondary battery comprising a lithium ion-occlusion material, the lithium ion-occlusion material being an amorphous material consisting essentially of $B_2O_3$.

8. A negative electrode for a lithium secondary battery comprising a lithium ion-occlusion material, the lithium ion-occlusion material being an amorphous material consisting essentially of $B_2O_3$ and an oxide whose cation-oxygen bond strength is smaller than 335 kJ/mole.

9. The negative electrode for a lithium secondary battery according to claim 8, wherein the oxide whose cation-oxygen bond strength is smaller than 335 kJ/mole consists essentially of at least one modifier oxide selected from the group consisting of $MoO_2$, $WO_3$, $W_2O_5$, $Bi_2O_3$, $Sc_2O_3$, $La_2O_3$, $Y_2O_3$, MgO, $Li_2O$, BaO, CaO, SrO, $Na_2O$ and $K_2O$.

10. The negative electrode for a lithium secondary battery according to claim 8, wherein the oxide whose cation-oxygen bond strength is smaller than 335 kJ/mole consists essentially of at least one intermediate oxide selected from the group consisting of PbO, ZnO, CdO, $TiO_2$, $ZrO_2$ and $Al_2O_3$.

11. The negative electrode for a lithium secondary battery according to claim 8, wherein the oxide whose cation-oxygen bond strength is smaller than 335 kJ/mole consists essentially of at least one modifier oxide selected from the group consisting of $MoO_2$, $WO_3$, $W_2O_5$, $Bi_2O_3$, $Sc_2O_3$, $La_2O_3$, $Y_2O_3$, MgO, $Li_2O$, BaO, CaO, SrO, $Na_2O$ and $K_2O$ and at least one intermediate oxide selected from the group consisting of PbO, ZnO, CdO, $TiO_2$, $ZrO_2$ and $Al_2O_3$.

12. The negative electrode for a lithium secondary battery according to claim 8, wherein the amorphous material consists essentially of one mole part of $B_2O_3$ and not more than 9 mole parts of the oxide whose cation-oxygen bond strength is smaller than 335 kJ/mole.

* * * * *